United States Patent
Tchang et al.

(10) Patent No.: US 7,637,538 B2
(45) Date of Patent: Dec. 29, 2009

(54) HEATER CORE ASSEMBLY

(75) Inventors: Michael Tchang, Bloomfield Hills, MI (US); Steven Dargel, Shelby Township, MI (US); David Forsyth, Sylvan Lake, MI (US)

(73) Assignee: Behr America, Inc., Troy, MI (US)

( * ) Notice: Subject to any disclaimer, the term of this patent is extended or adjusted under 35 U.S.C. 154(b) by 265 days.

(21) Appl. No.: 11/790,711

(22) Filed: Apr. 27, 2007

(65) Prior Publication Data
US 2008/0264605 A1    Oct. 30, 2008

(51) Int. Cl.
*F16L 23/00* (2006.01)
(52) U.S. Cl. .............. 285/124.4; 285/124.3; 285/124.5; 285/205
(58) Field of Classification Search ............... 285/124.3, 285/124.4, 124.5, 205–207, 403, 406–407
See application file for complete search history.

(56) References Cited

U.S. PATENT DOCUMENTS

| | | | | |
|---|---|---|---|---|
| 1,372,491 A | * | 3/1921 | Dorman | 285/124.3 |
| 4,116,476 A | * | 9/1978 | Porter et al. | 285/124.4 |
| 5,234,185 A | * | 8/1993 | Hoffman et al. | 248/56 |
| 5,653,475 A | | 8/1997 | Scheyhing et al. | |
| 6,758,500 B2 | | 7/2004 | Lehnhardt | |
| 6,776,421 B2 | * | 8/2004 | Florence et al. | 277/602 |
| 6,802,512 B2 | * | 10/2004 | Muller et al. | 277/607 |
| 2006/0001261 A1 | * | 1/2006 | Miyajima et al. | 285/136.1 |

FOREIGN PATENT DOCUMENTS

| | | |
|---|---|---|
| DE | 199 53 129 | 5/2001 |
| DE | 100 29 366 | 12/2001 |

* cited by examiner

*Primary Examiner*—Aaron M Dunwoody
*Assistant Examiner*—Fannie Kee
(74) *Attorney, Agent, or Firm*—Walter Ottesen

(57) ABSTRACT

A heater core assembly includes a heater core having two tube stubs projecting therefrom. Two heater tubes engage the two tube stubs, respectively, to define respective abutting interfaces therewith. A clamp couples the heater tubes to corresponding ones of the tube stubs. The clamp includes a first bracket half having two arcuately-shaped openings formed therein for accommodating the stub/tube pairs at the abutting interfaces to permit the stub/tube pairs to extend transversely to the clamp. A second bracket half is hinge connected to the first bracket half to permit opening and closing of the clamp. The second bracket half has two arcuately-shaped openings to accommodate the stub/tube pairs when the second bracket half is pivoted onto the first bracket half. A latch latches the first bracket half and the second bracket half to each other when the clamp is closed.

15 Claims, 8 Drawing Sheets

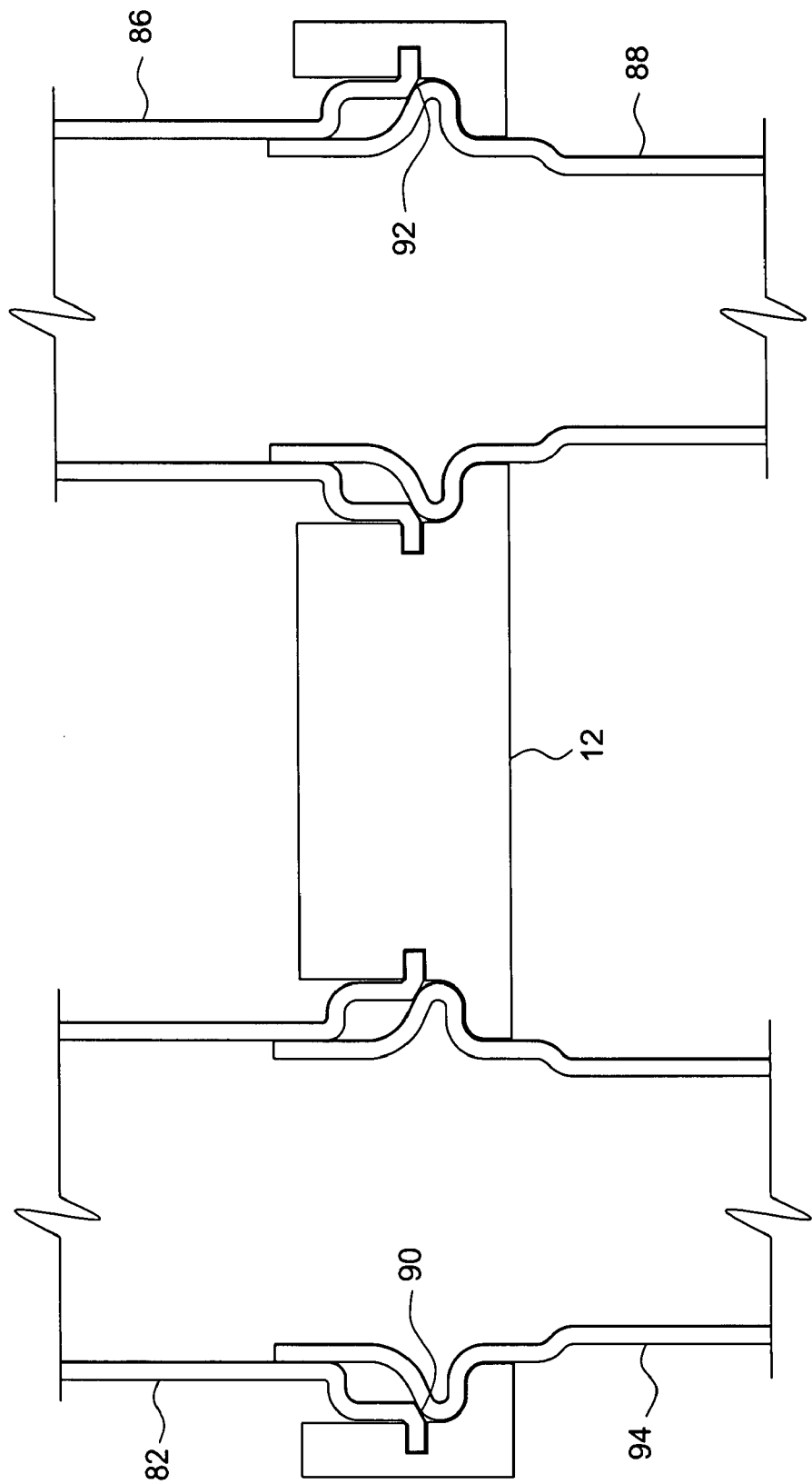

HEATER CORE ASSEMBLY

FIELD OF THE INVENTION

The invention relates to a heater core assembly wherein heater tubes are connected to a heater core.

BACKGROUND OF THE INVENTION

Heater tubes are connected to a heater core, for example, in HVAC systems in motor vehicles. Present day heater core connections often consist of simply brazing the heater tubes to the heater core. Alternatively, the heater core connection can include metal clips that slide over the connection. The problem associated with these connections is that the clips can slide or bend and allow the seal to be broken when the heater tubes are bent or deflected. In the case where the heater tubes are brazed to the heater core, metal fatigue can lead to an early rupture of the connection. The conventional connection of the heater tubes to the heater core holds the tubes in only two directions and provides no effective lateral support.

SUMMARY OF THE INVENTION

In view of the above, it is an object of the invention to provide a heater core assembly wherein good lateral support is imparted to the connection of the heater tubes to the heater core. It is also an object of the invention to provide a coupling arrangement for coupling at least two pairs of conduit members.

The heater core assembly of the invention includes: a heater core; the heater core having first and second tube stubs projecting therefrom; first and second heater tubes engaging the first and second tube stubs, respectively, so as to define respective abutting interfaces therewith; the first tube stub and the first heater tube defining a first stub/tube pair and the second tube stub and the second heater tube defining a second stub/tube pair; a clamp for coupling the heater tubes to corresponding ones of the tube stubs; the clamp including: a first bracket half defining a plane and having two arcuately-shaped openings formed therein for accommodating the first and second stub/tube pairs, respectively, at the corresponding abutting interfaces thereof so as to permit the stub/tube pairs to extend transversely to the plane; a second bracket half disposed in the plane and being hinge connected to the first bracket half so as to permit the clamp to be opened and closed; the second bracket half likewise having two arcuately-shaped openings to accommodate the stub/tube pairs, respectively, when the second bracket half is pivoted onto the first bracket half; the arcuately-shaped openings being matched to the diameters of corresponding ones of the stub/tube pairs for snugly holding the same in the clamp when the clamp is closed; the first and second bracket halves having a thickness measured in the longitudinal direction of each of the stub/tube pairs to extend beyond the abutting interfaces so as to permit the clamp to hold the stub/tube pairs at both sides of each of the abutting interfaces thereby laterally supporting the stub/tube pairs and preventing bending of the stub/tube pairs at the respective abutting interfaces thereof; and, latch means for latching the first bracket half and the second bracket half to each other when the clamp is closed.

The clamp can be made of plastic, for example, and grips the heater tubes and the tube stub in all directions. Most importantly, the clamp prevents the heater tube from pivoting at the connection to the heater core which can ultimately lead to metal fatigue and a rupture of the connection to the heater core. The clamp of the heater core assembly is configured as two bracket halves hinge connected by a living hinge and can be made using injection molding techniques. The clamp allows for quick and easy installation thereof and includes a latching device for self locking which eliminates the need for any additional fasteners.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
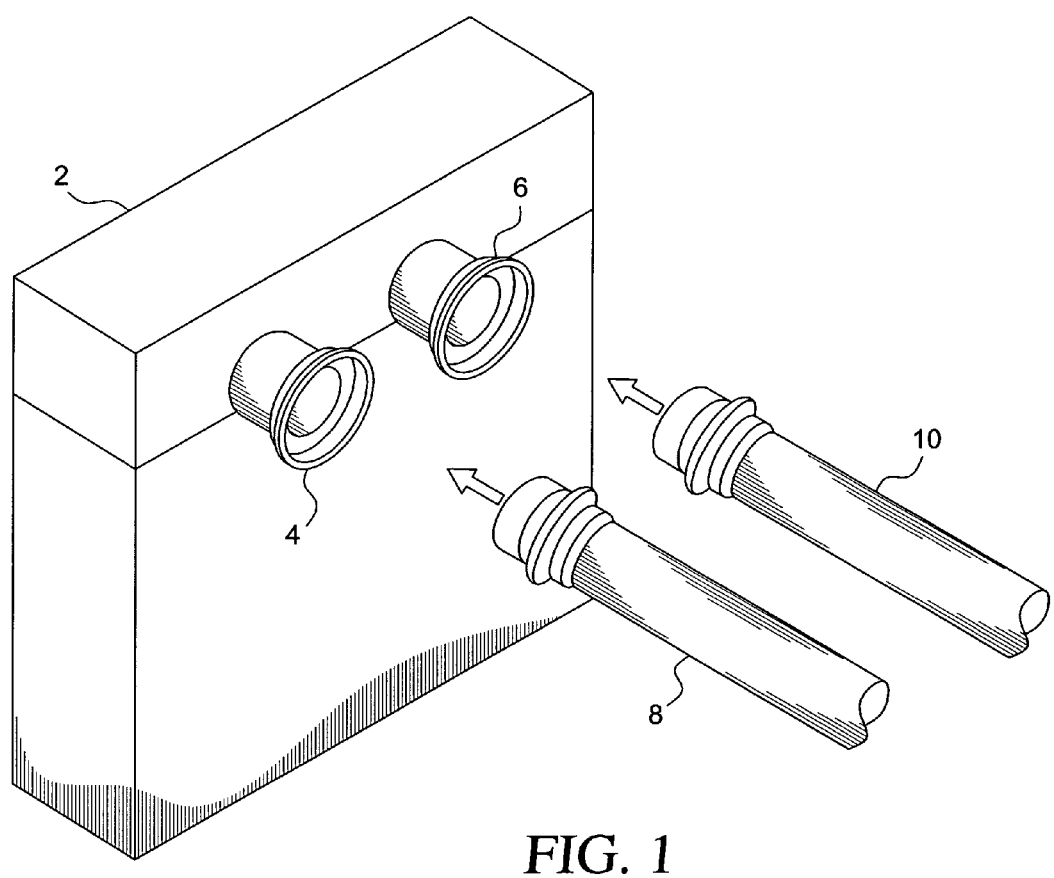
FIG. 1 is a perspective schematic of the heater core and two heater tubes about to be connected to respective tube stubs on the heater core.

FIG. 1 shows a heater core 2 having two tube stubs in the form of two core cups 4 and 6 brazed to the heater core. The two core cups (4, 6) define passages for coolant into and out of the tubing of the heater core. Two heater tubes 8 and 10 are shown about to be slip fitted into the core cups 4 and 6, respectively.

Figure 2:
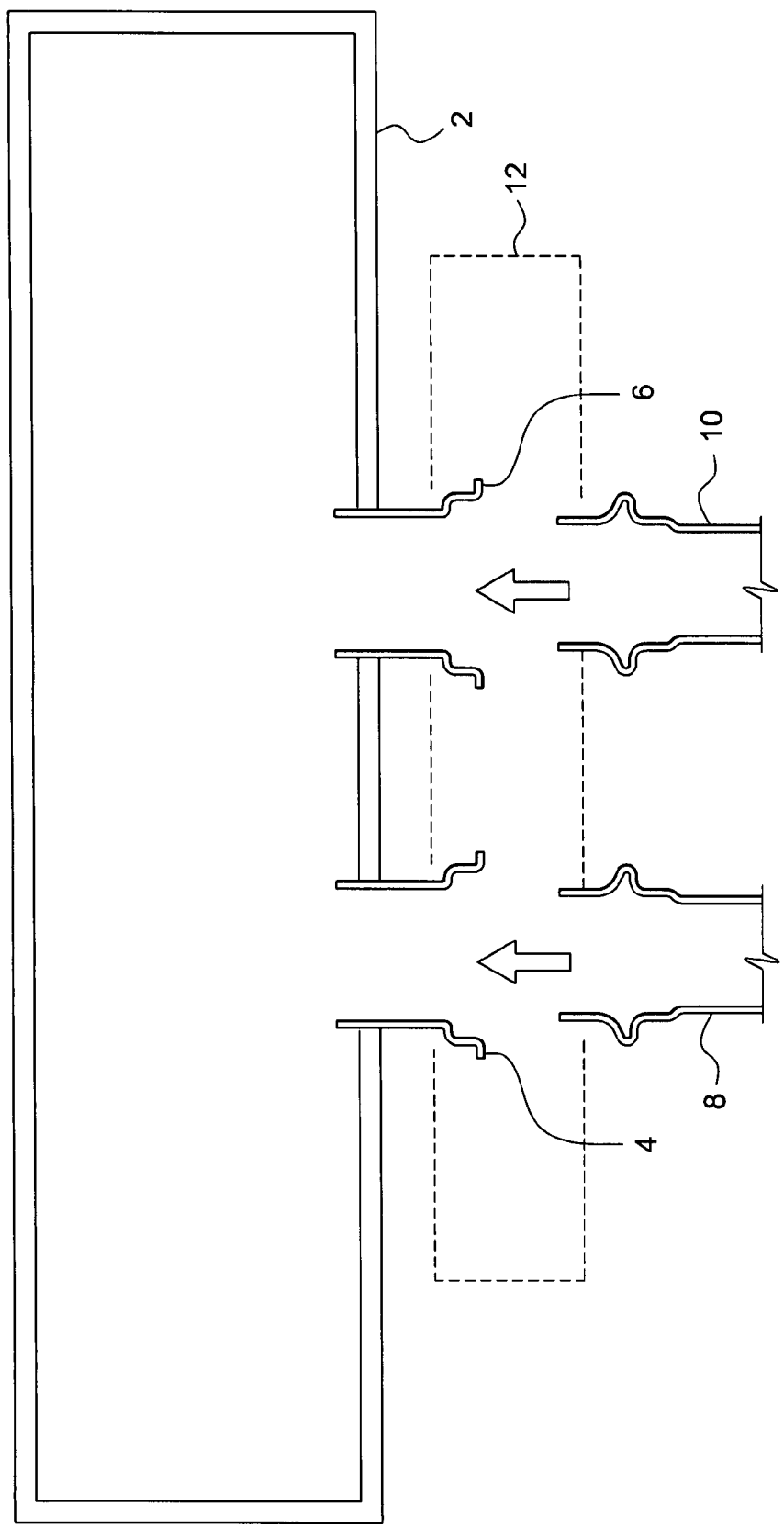
FIG. 2 is a plan view, in section, of the heater core and the two heater tubes about to be inserted into corresponding ones of the tube stubs on the heater core.

FIG. 2 is a section plan view which also shows the heater tubes 8 and 10 about to be placed in position against the respective core cups 4 and 6. The clamp 12 is shown in phantom outline to show its position after the heater tubes 8 and 10 are in place.

Figure 3:
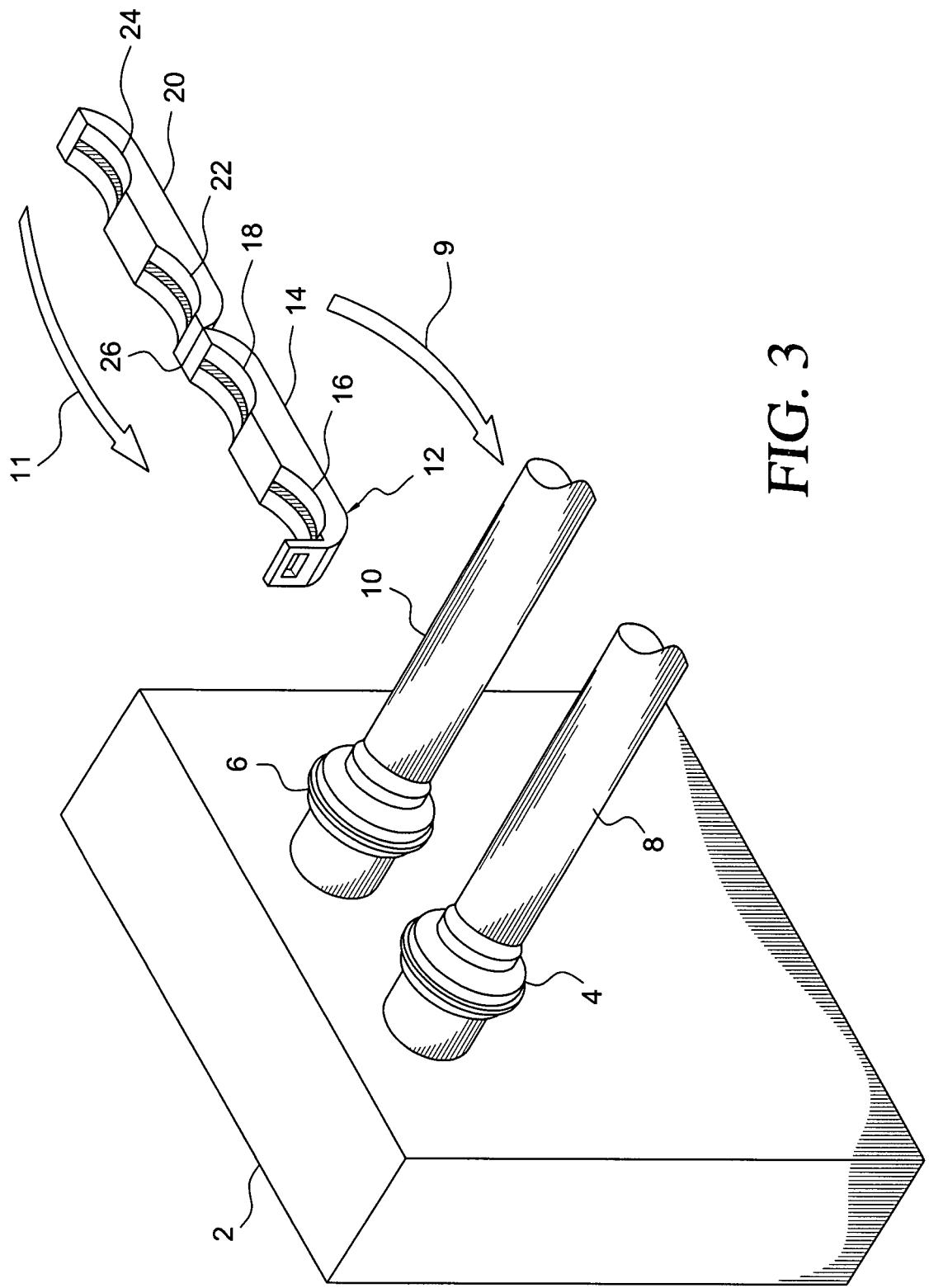
FIG. 3 is a perspective schematic showing the heater tubes in contact engagement with respective ones of the tube stubs with the clamp shown in the open position.

The next step for securing the heater tubes 8 and 10 to the core cups 4 and 6 is shown in FIG. 3. Here, a clamp 12 is in the open position and readied for placement over the respective stub/tube pairs. The clamp 12 is first placed in position adjacent the heater core as indicated by arrow 9 and then the clamp is closed as indicated by arrow 11.

The clamp 12 includes a bracket half 14 defining a plane extending transversely to the respective longitudinal axes of the stub/tube pairs. The bracket half 14 has arcuately-shaped openings 16 and 18 formed therein for accommodating the first and second stub/tube pairs (4, 8; 6, 10), respectively, at corresponding abutting interfaces thereof so as to permit the stub/tube pairs to extend transversely to the plane defined by the clamp.

Figure 5:
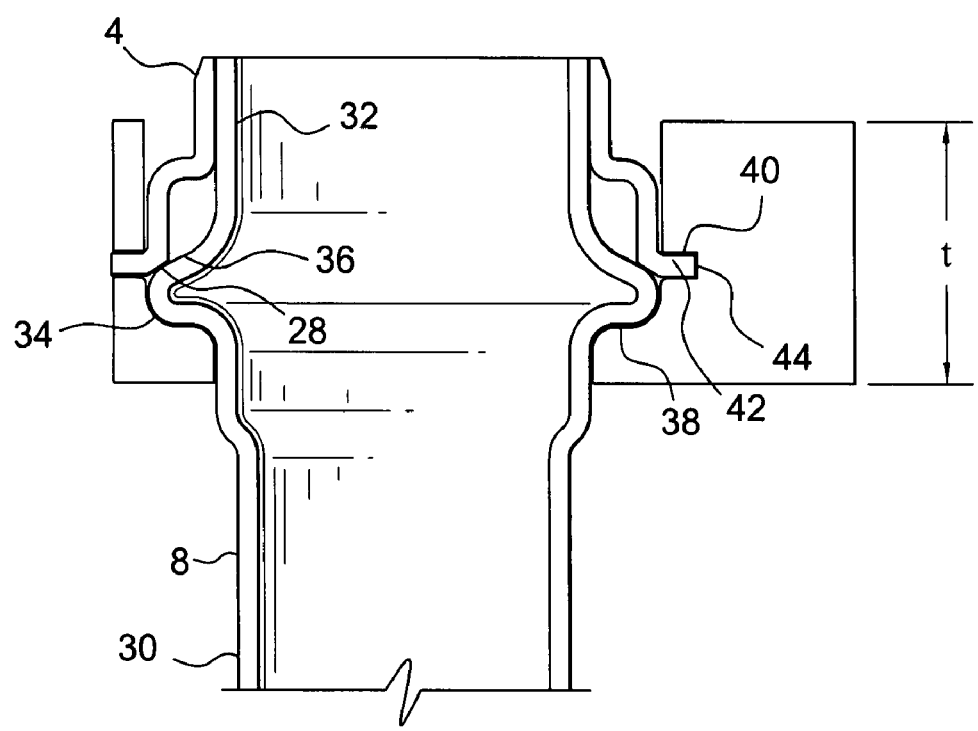
FIG. 5 is a detail schematic showing one of the heater tubes in engagement with a corresponding tube stub of the heater core.

The abutting interface is shown in FIG. 5 for one of the stub/tube pairs and is identified by reference numeral 28.

Figure 4:
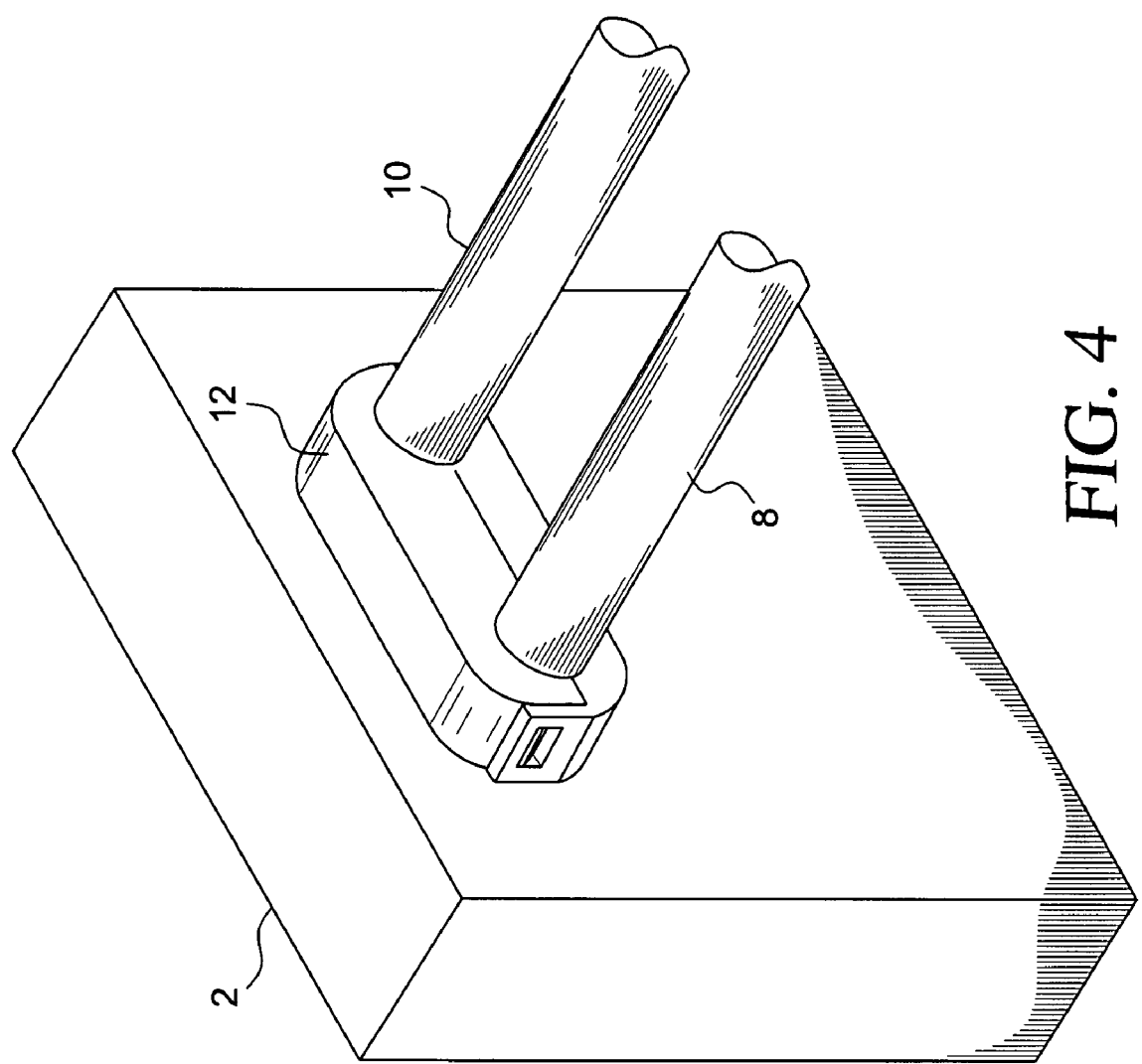
FIG. 4 is a perspective schematic showing the clamp in the closed position and holding the heater tubes in place in corresponding ones of the tube stubs.

The other bracket half 20 likewise has two arcuately-shaped openings 22 and 24 for accommodating respective stub/tube pairs. The bracket half 20 is hinge connected and pivoted onto the bracket half 14 for closing the clamp as shown in FIG. 4. The clamp 12 made of plastic is a one-piece design wherein the two bracket halves (14, 20) are joined by a thin section 26 that is bendable thereby forming a living hinge. The arcuately-shaped openings are matched to the diameters of corresponding ones of the stub/tube pairs for snugly holding the same in the clamp when the clamp is closed. Latches self lock and hold the clamp in the closed position and these latches will be described hereinafter with respect to FIGS. 6 and 7.

As shown in FIG. 5, the two bracket halves (14, 20) have a width (t) measured in the longitudinal direction of the stub/tube pairs. This width (t) extends beyond the abutting interface 28 in both longitudinal directions to permit the clamp 12 to hold each stub/tube pair at both sides of the abutting interface 28 thereby laterally supporting the stub/tube pair and preventing bending of the stub/tube pairs at the abutting interface.

As also shown in FIG. 5, the heater tube 8 has an outer surface 30 and an end portion 32 defining an annular collar-like projection 34 extending radially outwardly from the surface 30. The projection 34 defines a stop surface 36 facing toward the core cup 4. The core cup 4 and the stop surface 36 conjointly define the abutting interface 28.

The bracket halves (14, 20) conjointly define a set of holding surfaces for each of the stub/tube pairs and hold the core cups and the end portions of the stub/tube pairs in position to prevent the end portions from separating from corresponding ones of the core cups when the clamp 12 is closed.

As shown in FIG. 5, a first one of the holding surfaces of a set of holding surfaces formed on the bracket halves (14, 20) is identified by reference numeral 38 and a second one of the holding surfaces is identified by reference numeral 40. The holding surface 38 contact engages the annular collar-like projection 34 of the heater tube 8 and the second holding surface 40 contact engages the core cup 4.

Each of the core cups has an annular flange 42 extending radially therefrom and the bracket halves conjointly define an annular slot 44 which defines the second holding surface 40 and accommodates the annular flange 42 therein.

Figure 6:
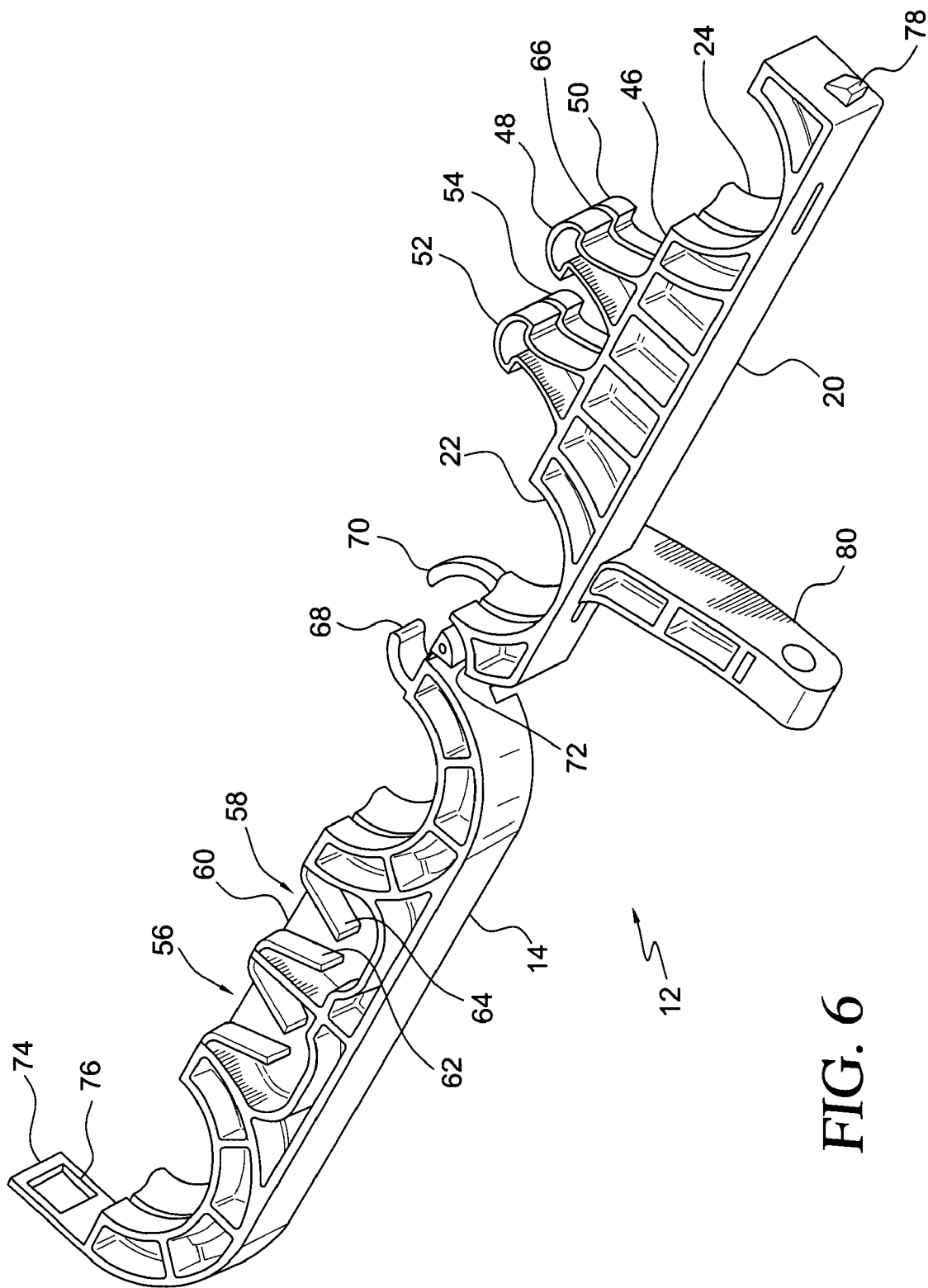
FIG. 6 is a perspective view of the heater tube clamp shown in the open position.

Referring to FIG. 6, the bracket half 20 has a support surface 46 extending between the two arcuately-shaped openings 22 and 24. In the embodiment of the clamp 12 shown, the latching means includes four latch units and each latch unit includes an insert element and a catch. The insert elements of the latch units are identified by reference numerals (48, 50, 52, 54). Four catches are provided on the bracket half 14. Only the catches 56 and 58 corresponding to insert elements 52 and 48 are shown. The catches for the insert elements 54 and 50 are hidden from view by a partition wall 60 of the bracket half 14. Each of the catches includes two prongs (62, 64) which engage under the corresponding insert elements to self lock the clamp 12.

Figure 7:
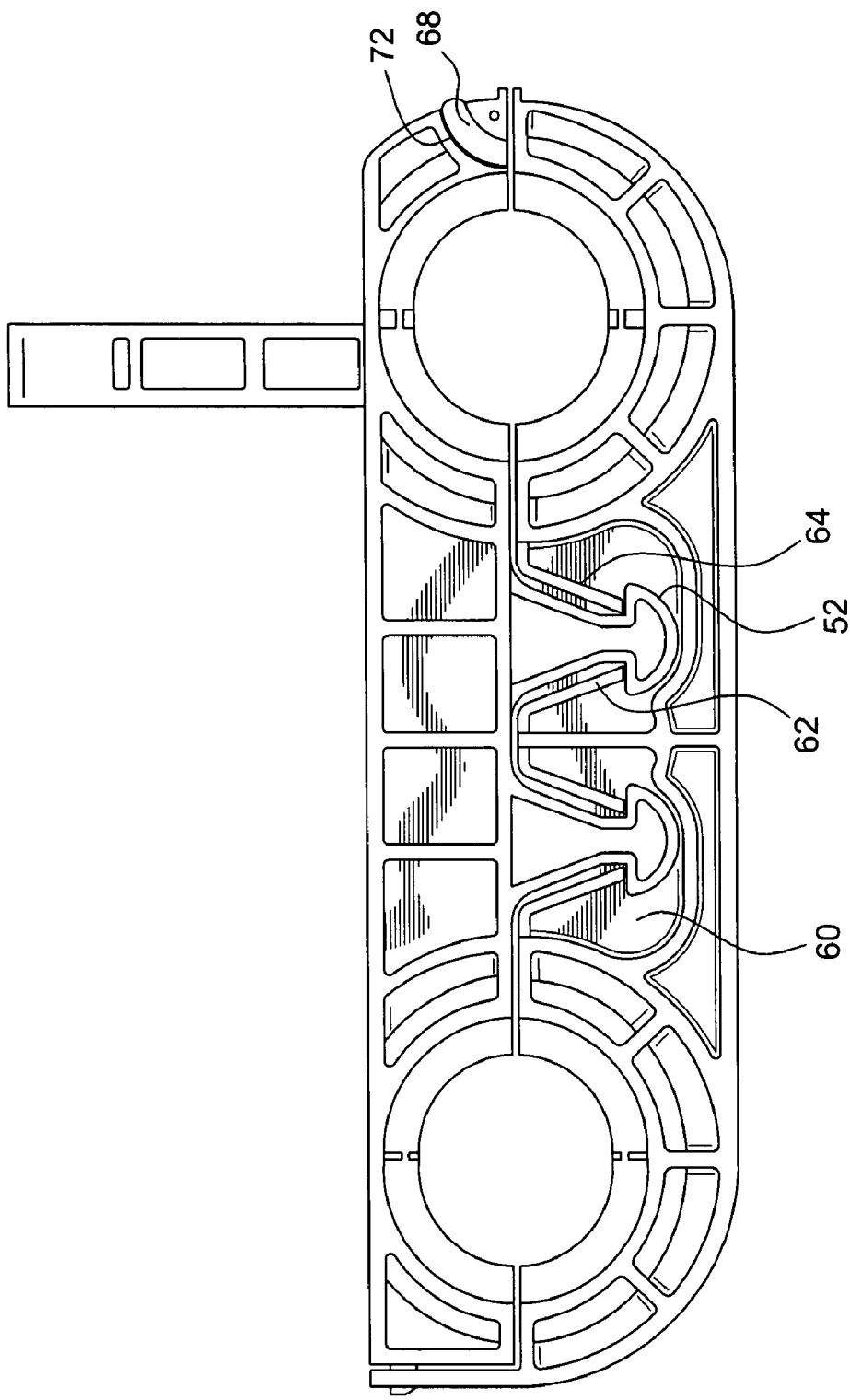
FIG. 7 is a side elevation view of the heater tube clamp shown in the closed position; and, FIG. 8 is a schematic, in section, showing the clamp of FIGS. 6 and 7 clamping two pairs of conduit members with each pair of conduit members defining an abutting interface.

The insert elements are each configured to have a mushroom-like shape and FIG. 7 shows how the prongs (62, 64) hold the insert element when the clamp 12 is closed. The two insert elements 48 and 50 are separated by a gap 66 as shown in FIG. 6 as are insert elements 52 and 54. The gap 66 allows the partition wall to pass between the insert elements 52 and 48 on one side of the clamp 12 and the insert elements 50 and 54 on the other side of the clamp.

Each bracket half has small arc-shaped segments 68 and 70 which are curved towards the other bracket half. These arc-shaped segments coact with a corresponding curved surface on the opposite bracket half and function to guide the bracket halves during closing of the clamp. Only the concave surface 72 corresponding to arc-shaped segment 68 is shown in FIGS. 6 and 7. The concave surface on bracket half 20 is hidden from view in both FIGS. 6 and 7.

An ancillary locking device includes a projecting tab 74 having aperture 76. When the bracket half 20 is closed down upon the bracket half 14, the apertured projecting tab 74 passes over lug 78 so that the apertured tab 74 hooks over the lug 78 thereby providing a further assurance that the clamp 12 remains closed after it is mounted and installed as part of the heater core assembly.

An arm 80 extends from bracket half 20 and is provided to facilitate mounting of the clamp, for example, on the heater core.

FIG. 8 shows how the clamp can be utilized for coupling two pairs of conduit members with each pair of the conduit members defining an annular abutting interface. The first pair of conduit members includes conduit members (82, 94) and the second pair of conduit members includes conduit members (86, 88). The abutting interface for the first pair of conduit members is identified by reference numeral 90 and the second abutting surface by reference numeral 92.

The clamp is a one-piece design and allows for easy installation of the clamp with only a single part. The clamp is self locking which eliminates any need for fasteners or the like.

It is understood that the foregoing description is that of the preferred embodiments of the invention and that various changes and modifications may be made thereto without departing from the spirit and scope of the invention as defined in the appended claims.

What is claimed is:

1. A heater core assembly comprising:

a heater core;

said heater core having first and second tube stubs projecting therefrom;

first and second heater tubes engaging said first and second tube stubs, respectively, so as to define respective abutting interfaces therewith;

said first tube stub and said first heater tube defining a first stub/tube pair and said second tube stub and said second heater tube defining a second stub/tube pair;

a clamp for coupling said heater tubes to corresponding ones of said tube stubs;

said clamp including:

a first bracket half defining a plane and having two arcuately-shaped openings formed therein for accommodating said first and second stub/tube pairs, respectively, at the corresponding abutting interfaces thereof so as to permit said stub/tube pairs to extend transversely to said plane;

a second bracket half disposed in said plane and being hinge connected to said first bracket half so as to permit said clamp to be opened and closed;

said second bracket half having two arcuately-shaped openings to accommodate said stub/tube pairs, respectively, when said second bracket half is pivoted onto said first bracket half;

said arcuately-shaped openings being matched to the diameters of corresponding ones of said stub/tube pairs for snugly holding the same in said clamp when said clamp is closed;

said first and second bracket halves having a thickness measured in the longitudinal direction of each of said stub/tube pairs to extend beyond said abutting interfaces so as to permit said clamp to hold said stub/tube pairs at both sides of each of said abutting interfaces thereby laterally supporting said stub/tube pairs and preventing bending of said stub/tube pairs at the respective abutting interfaces thereof;

latch means for latching said first bracket half and said second bracket half to each other when said clamp is closed;

said first bracket half having a support extending between the two arcuately-shaped openings thereof;

said latch means comprising at least one latch unit including an insert element disposed on said support between the two arcuately-shaped openings of said first bracket half; and, a catch being formed on said second bracket half between the two arcuately-shaped openings thereof for catching and holding said insert element when said clamp is closed.

2. The heater core assembly of claim 1, wherein:

the heater tube of each one of said stub/tube pairs has an outer surface and an end portion defining an annular collar-shaped projection extending radially outwardly from said surface;

said projection having a stop surface facing toward the tube stub of said one stub/tube pair;

the tube stub of said one stub/tube pair being formed as a core cup for receiving said end portion therein while causing said core cup to abut against said stop surface to define the abutting interface of said one pair; and, said bracket halves conjointly defining a set of holding surfaces for each of said stub/tube pairs for holding the core cups and end portions of said stub/tube pairs in position to prevent said end portions from separating from corresponding ones of the core cups when said clamp is closed.

3. The heater core assembly of claim 2, wherein a first one of the holding surfaces of each set engages the annular collar-shaped projection of the heater tube and a second one of the holding surfaces of each set engages the core cup corresponding to the heater tube connected thereto.

4. The heater core assembly of claim 3, wherein each of the core cups has an annular flange extending radially therefrom and said bracket halves conjointly define an annular slot defining the second holding surface and accommodating the annular flange therein.

5. The heater core assembly of claim 1, wherein said latch means comprises two of said latch units arranged one next to the other between said arcuately-shaped openings.

6. The heater core assembly of claim 1, wherein said latch means comprises a first pair of said latch units mounted side-by-side and being adjacent one of said arcuately-shaped openings and a second pair of latch units mounted side-by-side next to the other one of said arcuately-shaped openings.

7. The heater core assembly of claim 1, wherein said insert element is a mushroom-shaped element and said catch includes at least two prongs which engage under said mushroom-shaped element causing said latch unit to self-lock and hold said coupling arrangement in the closed position.

8. A coupling arrangement for coupling at least two pairs of conduit members with each pair of said conduit members defining an abutting interface, the coupling arrangement comprising:

a first bracket half defining a plane and having two arcuately-shaped openings formed therein for accommodating said pairs of conduit members, respectively, at the corresponding connecting abutting interfaces thereof so as to permit said pairs of conduit members to extend transversely to said plane;

a second bracket half disposed in said plane and being hinge connected to said first bracket half so as to permit said coupling arrangement to be opened and closed;

said second bracket half having two arcuately-shaped openings to accommodate said pairs of conduits, respectively, when said second bracket half is pivoted onto said first bracket half;

said arcuately-shaped openings being matched to the diameters of corresponding ones of said pairs of conduit members for snugly holding the same in said coupling arrangement when said coupling arrangement is closed;

said first and second bracket halves having a thickness measured in the longitudinal direction of each of said pairs of conduit members to extend beyond said abutting interfaces so as to permit said coupling arrangement to hold said pairs of conduits at both sides of each of said abutting interfaces thereby laterally supporting said pairs of conduit members and preventing bending of said pairs of conduit members at the respective abutting interfaces thereof;

latch means for latching said first bracket half and said second bracket half to each other when said coupling arrangement is closed;

said first bracket half having a support extending between the two arcuately-shaped openings thereof;

said latch means comprising at least one latch unit including an insert element disposed on said support between the two arcuately-shaped openings of said first bracket half; and, a catch being formed on said second bracket half between the two arcuately-shaped openings thereof for catching and holding said insert element when said coupling arrangement is closed.

9. The coupling arrangement of claim 8, wherein:

each one of said pairs of said conduit members includes a first conduit member and a second conduit member;

said first conduit member has an outer surface and a first end portion defining an annular collar-shaped projection extending radially outwardly from said surface; and, said projection has a stop surface facing toward said second conduit;

said second conduit member has a second end portion formed as a cup for receiving said first end portion therein while causing said cup to abut against said stop surface to define the abutting interface of said one pair; and, said bracket halves conjointly define a set of holding surfaces for each of said pairs of conduit members for holding the first and second end portions in position to prevent said end portions from separating when said coupling arrangement is closed.

10. The coupling arrangement of claim 9, wherein a first one of the holding surfaces of each set engages the annular collar-shaped projection of the first conduit member and a second one of the holding surfaces of each set engages the cup of the second conduit member.

11. The coupling arrangement of claim 10, wherein the cup of the second end portion has an annular flange extending radially therefrom and said bracket halves conjointly define an annular slot defining the second holding surface and accommodating the annular flange therein.

12. The coupling arrangement of claim 8, wherein said latch means comprises two of said latch units arranged one next to the other between said arcuately-shaped openings.

13. The coupling arrangement of claim 8, wherein said latch means comprises a first pair of said latch units mounted side-by-side and being adjacent one of said arcuately-shaped openings and a second pair of latch units mounted side-by-side next to the other one of said arcuately-shaped openings.

14. The coupling arrangement of claim 8, wherein said insert element is a mushroom-shaped element and said catch includes at least two prongs which engage under said mushroom-shaped element causing said latch unit to self-lock and hold said coupling arrangement in the closed position.

15. A heater core assembly comprising:

a heater core;

said heater core having first and second tube stubs projecting therefrom;

first and second heater tubes engaging said first and second tube stubs, respectively, so as to define respective abutting interfaces therewith;

said first tube stub and said first heater tube defining a first stub/tube pair and said second tube stub and said second heater tube defining a second stub/tube pair;

a clamp for coupling said heater tubes to corresponding ones of said tube stubs;

said clamp including:

a first bracket half defining a plane and having two arcuately-shaped openings formed therein for accommodating said first and second stub/tube pairs, respectively, at the corresponding abutting interfaces thereof so as to permit said stub/tube pairs to extend transversely to said plane;

a second bracket half disposed in said plane and being hinge connected to said first bracket half so as to permit said clamp to be opened and closed;

said second bracket half having two arcuately-shaped openings to accommodate said stub/tube pairs, respectively, when said second bracket half is pivoted onto said first bracket half;

said arcuately-shaped openings being matched to the diameters of corresponding ones of said stub/tube pairs for snugly holding the same in said clamp when said clamp is closed;

said first and second bracket halves having a thickness measured in the longitudinal direction of each of said stub/tube pairs to extend beyond said abutting interfaces so as to permit said clamp to hold said stub/tube pairs at both sides of each of said abutting interfaces thereby laterally supporting said stub/tube pairs and preventing bending of said stub/tube pairs at the respective abutting interfaces thereof;

latch means for latching said first bracket half and said second bracket half to each other when said clamp is closed;

said first bracket half having a support extending between the two arcuately-shaped openings thereof;

said latch means comprising two latch units mounted side-by-side when viewed in the direction of said conduits;

each of said latch units including an insert element disposed on said support; and, a catch being formed on said second bracket half between the two arcuately-shaped openings thereof for catching and holding said insert element when said coupling arrangement is closed; and, a wall formed on said second bracket half disposed between said two latch units to provide lateral support to said insert elements as they engage with corresponding ones of said catches when said clamp is closed.

* * * * *